ALBERT W. TONDREAU,
ELDRED B. MCGREAL,
INVENTORS

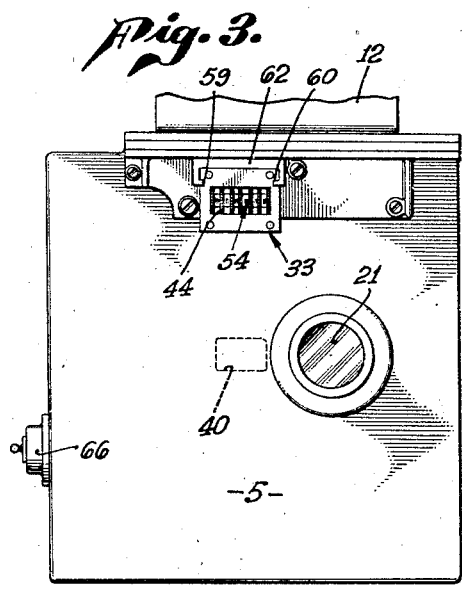
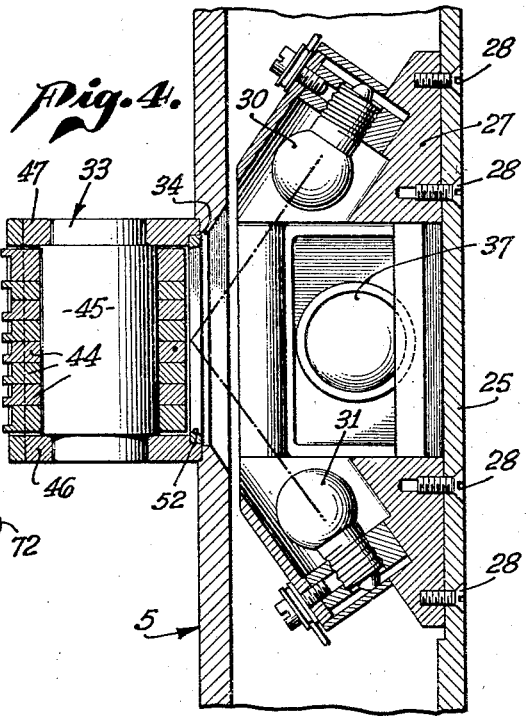
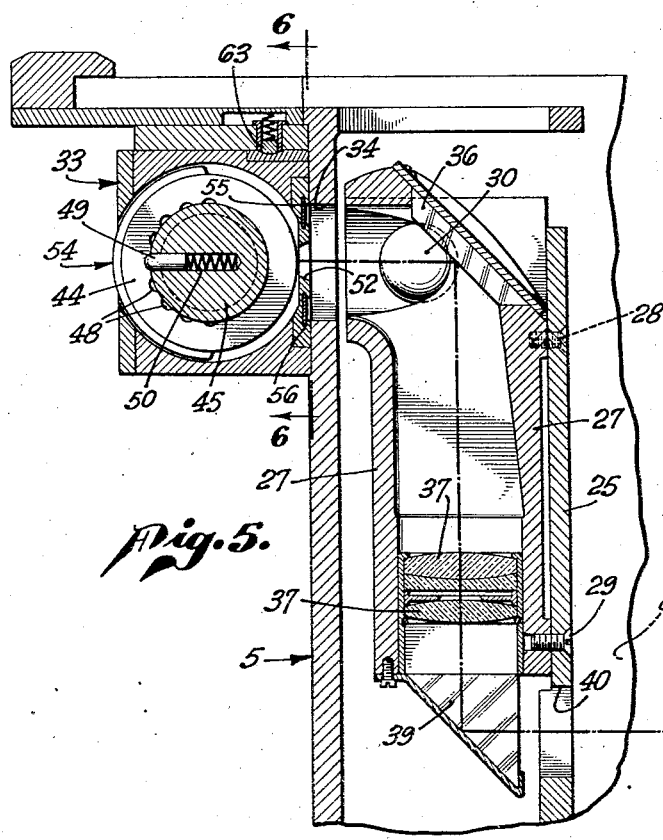
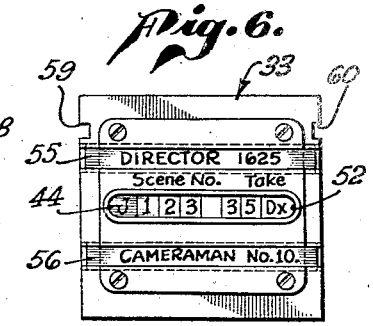
Albert W. Tondreau, Eldred B. McGreal, INVENTORS Patented June 11, 1946

2,402,100

UNITED STATES PATENT OFFICE 2,402,100

FILM SLATING SYSTEM

Albert W. Tondreau and Eldred B. McGreal, Los Angeles, Calif., assignors to Warner Brothers Pictures, Inc., a corporation of Delaware Application June 1, 1942, Serial No. 445,352

13 Claims. (Cl. 88—16)

This invention relates to motion picture apparatus and particularly to a marking and slating system for picture film of a semi-automatic nature.

It is well known in the art of motion picture production that the picture negative film is marked and/or slated for identifying the particular sequence or "take" in a motion picture continuity. That is, information is photographed upon the film at the beginning of the sequence to indicate the director of the picture, the cameraman, the particular scene and take and the nature of the scene such as a daylight exterior or night interior, the latter information aiding the laboratory in processing the film. The present invention is directed to a system for photographing such information on the film at the beginning of the take.

Devices for slating motion picture film are well known in the art, the oldest form perhaps being the clapstick slate wherein the information above mentioned is written on a slate with chalk or pencil and then held in front of the camera and photographed on a series of frames at the beginning of the sequence. The clapstick type of slate is used to also provide a synchronizing mark on the picture film and sound film. This is accomplished by employing a hinged strip on the slate which is brought in contact with the slate after the film is up to speed. The coming together of the two portions is photographed on the picture film while the sound of contact is recorded on the sound film. Such slates have many disadvantages in that they are an annoyance to the actors, they are difficult to position at the proper position in the various scenes, and they are wasteful of film.

Other forms of slates are also well known in the art, such as those shown in Arnold Patent No. 1,810,002; Tyson Patent No. 2,236,767; and in Thomas Patent No. 2,303,181. The majority of these prior art systems, however, are inconvenient to operate and require considerable adjustment to properly focus the slate information on the film when different lenses are used. These slates also require a manual operation to produce the "sync" marks.

The present invention is directed to a slating system for a picture film wherein the "sync" marking and slating are done substantially automatically, the slater being incorporated within the camera case and operated during the normal operation of the camera. The slating may even be accomplished without the cameraman being conscious of it. In operating the standard type of motion picture camera, the camera is moved away from the photographing lens or lenses, which are fixedly positioned on the outside casing, in order to focus the lenses on a ground glass, which is in the film position, and to study the composition of the scene to be photographed. After the focusing has been accomplished the camera is then racked back to its photographing position and the scene is "shot" or photographed.

In the present invention the slating is accomplished during the time when the camera is out of photographing position and while the operator is still focusing the lenses on the scene or studying the composition of the scene. In the usual operation of the device, the motor is started and the film advanced through the camera while the camera is in the non-photographing position, the cameraman waiting until the last moment before bringing the camera into the photographing position. The film is slated during these normal movements of the camera and since the slating elements are fixed and independent of the photographing lenses, the slating is always accomplished in an accurate manner. The invention also eliminates the necessity of having any large slating elements mounted on or suspended from different portions of the camera or camera case, so that the device requires very little modification of the ordinary camera structure. Film is saved since the slating is accomplished during the acceleration period of the film and when the cameraman hears the signal indicating the film is up to speed, he immediately racks the camera to photographing position.

The principal object of the invention, therefore, is to provide an improved means for the marking and/or slating of motion picture film.

Another object of the invention is to provide improved means for slating of a motion picture film during the normal manipulations of the camera in photographing a scene.

A further object of the invention is to provide an improved slating device which is incorporated within the camera structure, except for the indicia which is always in focus on the film.

A further object of the invention is to provide improved means for controlling automatically the impressing of a film with slating indicia while the camera is in the non-photographing position.

Although the novel features which are believed to be characteristic of this invention are pointed out with particularity in the claims appended hereto, the manner of its organization and the mode of its operation will be better understood by referring to the following description read in conjunction with the accompanying drawings, forming a part hereof, in which:

Fig. 3 is an end view of the camera shown in Figs. 1 and 2;

Fig. 4 is a cross-sectional plan view taken along the line 4—4 of Fig. 1;

Fig. 5 is a cross-sectional view taken along the line 5—5 of Fig. 2; and,

Fig. 6 is a detail view of the indicia on the indicia block used in the invention.

Figure 1:
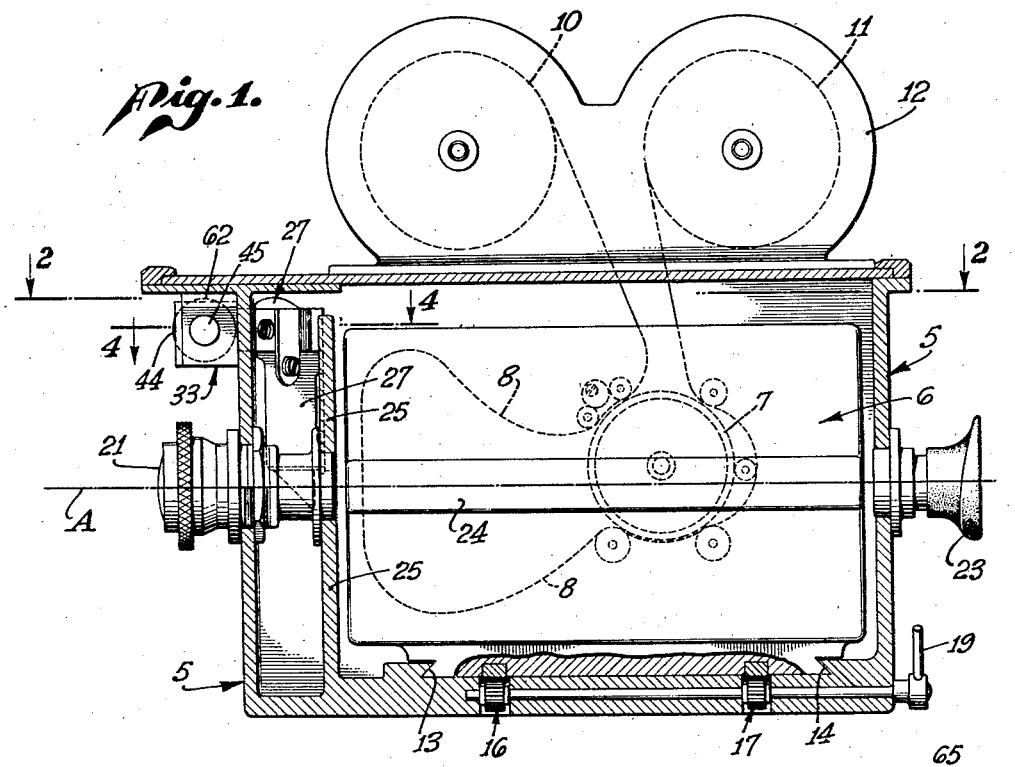
Fig. 1 is an elevational view of the camera structure embodying the invention.

Referring now to the drawings in which like numerals identify like elements, a casing 5 encloses a camera box 6 containing a film sprocket 7 and pull-down mechanism (not shown) for intermittently advancing a film 8 shown in dotted lines past an aperture in the camera box. The film is taken from a supply reel 10 and wound on a take-up reel 11 contained in a film magazine 12 mounted on top of casing 5. The camera 6 is mounted in grooves 13 and 14 and may be moved back and forth by rack and pinion combinations 16 and 17, the pinions being operated from a shaft having a handle 19 extending externally of the case 5. The camera may thus be racked back and forth between a position shown by the full lines and by the optical axis A in Fig. 2, and a position shown by the dot and dash lines and the optical axis B. When in the full line position the lens 21 mounted on the front of the case 5 will focus the scene on the film 8. When the camera is moved to the dot and dash line position the cameraman may place his eye at an eyepiece 23 and focus the scene on a ground glass 22 in the view finder 24 alongside the camera. The view finder has lenses 32 and 33 therein for providing any desired magnification of the image on the ground glass. After the scene has been focused the camera is moved back into photographing position substituting the film 8 for the ground glass 22. This is a standard motion picture camera arrangement.

The case 5, in addition to its normal outer wall, has an inner wall 25 spaced from the forward outer wall, as shown in Figs. 1, 2, 4 and 5. Mounted on the wall 25 and in the space between the front wall of the case 5 and wall 25 is a T-bracket 27 which is fastened to the wall 25 in any suitable manner, such as by screws 28 and 29. In the upper T-portion of the bracket 27 are mounted a pair of lamps 30 and 31 arranged substantially at a 45° angle to the wall 25 (see Fig. 4) and adapted to illuminate indicia as shown in Fig. 6 through an aperture 34 in the forward wall of the case 5 (see Fig. 5). The light reflected from the indicia is reflected by a mirror 36, positioned at a 45° angle to the aperture 34, downwardly through projection lenses 37 in the lower portion of the bracket 27.

Figure 2:
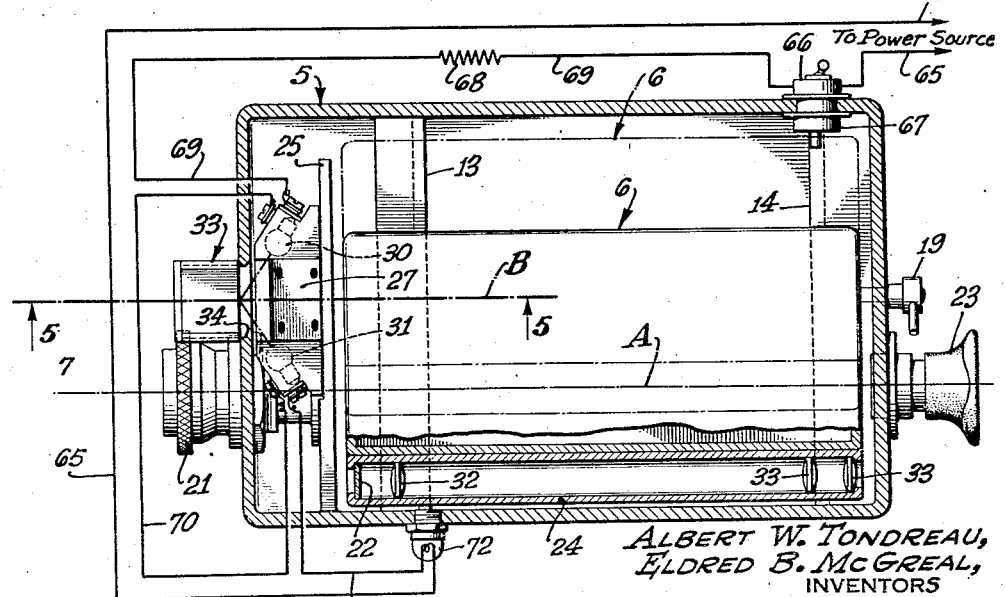
Fig. 2 is a plan view of the camera taken along the line 2—2 of Fig. 1.

The emergent light from lenses 37 is reflected through a prism 39 and through an aperture 40 in the wall 25 to the film 8, when the camera 6 is in the position shown by the dot and dash lines in Fig. 2. Thus, when the lamps 30 and 31 are energized, the light therefrom will provide an image of the indicia plate in Fig. 6 on the film 8 when the film is in front of the aperture 40.

The indicia shown in Fig. 6 is composed of several components, the center portion being on the circumferences of a series of knurled rings 44 mounted on a shaft 45, the ends of the shaft being mounted in the sides 46 and 47 of the indicia block 33. The indicia rings 44 have internal notches 48 therein adapted to accommodate the ends of respective pins 49 under tension of springs 50 to accurately position the letters and figures in the aperture 52 (see Fig. 5). The rings have duplicate sets of indicia 54 diametrically opposite one another on the circumference of the ring so that the operator may know which particular number or letter is at the aperture 52 (see Fig. 3). These rings provide the scene number, take number and the character of the scene which may be readily and rapidly changed by the cameraman or other operator by simply rotating the proper ring or rings. More permanent information which is not varied as frequently is positioned in the aperture 34 by means of slides 55 and 56 which may be of paper or metal and slid in appropriate grooves in the face of the indicia block.

The indicia block 33 may be positioned adjacent the aperture 34 or removed therefrom by sliding the block toward and away from, respectively, the front wall of the camera along grooves 59 and 60, which are accommodated by the ends of a bracket 62 attached to the wall (see Fig. 3). The indicia block is held in proper position by a spring-pressed pin 63 which is accommodated by a conjugate notch in the indicia block (see Fig. 5).

Referring again to Fig. 2, for the sake of clarity an energizing circuit for the lamps 30 and 31 is shown externally of the case 5, but it is to be understood that the actual conductors for the circuit are preferably located within the case 5. One of a pair of conductors 65 from any suitable power source is connected to an external switch 66, the circuit continuing through an internal microswitch 67, then to a resistance 68 over a conductor 69, the resistance providing the proper voltage for the lamps 30 and 31, then through the two lamps 30 and 31 over conductors 69, 70 and 71, then through a pilot lamp 72 and back over conductor 65 to the power source. The lamps 30 and 31 will not be energized unless both switches 66 and 67 are in closed position. The switch 66 of course, may be manually actuated to closed position externally of the case 5, but the switch 67 is operated to closed position by the camera 6 only when the camera is in the dot and dash line position shown in Fig. 2. Thus, when the camera 6 is racked over for focusing purposes, the switch 67 is actuated by the camera and the cameraman opens the camera shutter to expose the stationary film to the light from the indicia block 33 which burns the one frame adjacent the aperture 40. The camera, however, is still in the dot and dash line position when the camera motor is actuated and the film advanced, this action photographing on the accelerating film appropriate indicia such as shown in Fig. 6. When the film is up to speed, and the cameraman is so advised, he immediately racks the camera back to the photographing position to record the scene, thus breaking the energizing circuit for lamps 30 and 31.

This normal operating technique thereby provides a burned frame which may correspond to a pencil or punch mark placed on the sound film by the recordist and since the camera motor and sound recorder motor are brought up to speed in step and maintained in step, the burned frame will provide a "sync" mark for the picture negative. Since the image of the indicia was impressed on the film during acceleration thereof, this will provide the slate information required. Thus, the slating and marking is done automatically during the normal manipulations of the camera to photograph a scene, it being unnecessary to adjust any lenses or move any slating apparatus or element to accomplish the result. After the slating optical elements are once focused and placed in position, they require no further attention thereafter. The lamps, lenses and prisms mounted on bracket 27 are easily removable for cleaning by simply removing the bracket 27 from the wall 25. This invention also provides a slate which always fills a complete picture frame and is thus always of the same size and easily readable. With slates held in front of cameras, the information is photographed on different portions of the frames and varies in size with different lenses. The brightness of the slate images is also very consistent as compared with the images obtained with systems in which the slate is photographed through the photographing lenses.

It is to be noted that the only portion of the slating apparatus external of the case 5 is the indicia block 33 which is small and is in an unobtrusive position. The remaining elements of the slater occupy space which was heretofore unused or unoccupied. Furthermore, the "sync" marking and slating operations are now a part of the normal and usual camera manipulation for shooting a scene, the slating being accomplished without the actors or other on the scene being made aware of the operations.

We claim as our invention:

1. A photographic apparatus, comprising a camera box having an exposure aperture therein, a housing for said camera box, means for moving said camera box in said housing between a scene photographing position and a focusing position, a fixed optical unit mounted on said housing for photographing scenes on the film in said camera box through said exposure aperture when said camera box is in scene photographing position, an observation medium movable with said camera box and on which said optical unit images a scene to be photographed when said camera box is in focusing position, slating indicia mounted on said housing, and a second optical unit fixedly mounted with respect to said housing and said indicia for imaging said indicia on the film in said camera box through said exposure aperture when said camera box is in a position for focusing scenes through said first optical unit on said observation medium.

2. A photographic apparatus in accordance with claim 1 in which means are provided for illuminating said indicia, and means are provided for actuating said illuminating means in response to movement of said camera box into focusing position.

3. A photographic apparatus in accordance with claim 1 in which said slating indicia is detachably and adjustably mounted on said camera box housing.

4. A photographic apparatus comprising a camera box having an exposure aperture therein and means for advancing a film therethrough, a casing in which said camera box is movable to two positions, means for moving said camera box between said two position, an image observation medium movable with said camera box, a lens mounted on said casing, said lens projecting an image of a scene to be photographed on said film through said exposure aperture when said camera box is in one of said two positions and said lens projecting the image of said scene to be photographed on said image observation medium when said camera box is in the other of said two positions, slating indicia, and a second lens mounted within said casing for projecting an image of said slating indicia on said film through said exposure aperture when said camera box is in said last mentioned position.

5. A photographic apparatus in accordnce with claim 4 in which means are provided for illuminating said indicia.

6. A photographic apparatus in accordance with claim 4 in which illuminating means are provided for said slating indicia, an energizing circuit for said illuminating means, and a switch in said circuit adapted to be closed for energizing said illuminating means in response to movement of said camera box to said last mentioned position and for deenergizing said illuminating means in response to movement of said camera box to said first mentioned position.

7. A photographic apparatus comprising a camera box, means for supporting and advancing a film in said box, said camera box having an exposure aperture therein, a casing for said camera box, said casing having double walls in front of said camera box, means for moving said camera box between two positions in said casing, an image viewer movable with said camera box, a lens mounted in said double walls for imaging a scene on said film through said camera box exposure aperture when said camera box is in one of said two positions and for imaging said scene on said image viewer when said camera box is in the other of said two positions, a slate, and means mounted between said walls for imaging said slate on said film through said exposure aperture when said camera box is in said last mentioned position.

8. A photographic apparatus in accordance with claim 7 in which said last mentioned means includes upper and lower reflectors and intermediate projection lenses for projecting an image of said slate from an aperture in the upper portion of the outer wall through an aperture in the lower portion of the inner wall to said film and through said camera box exposure aperture, said slate being mounted outside said casing and in alignment with the aperture in the upper portion of said outer wall.

9. A photographic apparatus in accordance with claim 7 in which said last mentioned means includes a light source adapted to illuminate said slate, said slate being mounted externally of said casing and aligned with an aperture in the outer of said double walls, an energizing circuit for said light source, and a switch in said circuit operable to close said circuit in response to movement of said camera box to the position where the scene is imaged on said viewer.

10. A photographic apparatus in accordance with claim 7 in which said last mentioned means includes a light source for illuminating said slate, said slate being mounted externally of said casing and aligned with an aperture in the upper portion of said outer wall, upper and lower reflectors for projecting light from said slate between said walls, a lens intermediate said reflectors for projecting the image of said slate to said film through said camera box exposure aperture when said camera box is in said last mentioned position, and a unitary supporting bracket for all of said elements of said last mentioned means.

11. A photographic apparatus comprising a camera box having an exposure aperture therein, a film supporting and advancing means in said camera box, a casing for said camera box, said casing having a pair of apertures therein, means for moving said camera box back and forth within said casing to position said film at either of said two apertures, a lens at one of said apertures to project a scene on said film when said film is positioned thereat, slating indicia, and an optical unit adapted to project said slating indicia through the other of said apertures to said film when said film is located thereat.

12. A system for producing slating indicia on a motion picture film comprising a casing, slating indicia supported on said casing, a photographic lens having a focusing adjustment and supported on said casing, a camera box within said casing and slidable to different positions therein, means for supporting and advancing a film in said camera box, means for moving said box to receive on said film through an opening in said box an image of said indicia when said box is in one position in said casing and to receive on said film through said opening and through said photographic lens an image of a scene to be photographed when said box is in a second position in said casing, means mounted on said camera box and moved into alignment with said photographic lens when said camera box is in said first mentioned position for determining whether said scene is correctly focused during adjustment of said photographic lens, means for illuminating said indicia, and means operated in response to movement of said camera box to energize said illumination means in response to movement of said camera box to said first mentioned position and to de-energize said illumination means in response to movement of said camera box from said first mentioned position.

13. A system in accordance with claim 12 in which said focus determining means is an image viewer for viewing the image formed by said photographic lens when said camera box is in said first mentioned position.

ALBERT W. TONDREAU.
ELDRED B. McGREAL.